United States Patent
Pazhyannur et al.

(10) Patent No.: US 10,104,689 B2
(45) Date of Patent: Oct. 16, 2018

(54) WIRELESS SHARED SPECTRUM ACCESS CONTENTION BASED ON HARQ FEEDBACK

(71) Applicant: Cisco Technology, Inc., San Jose, CA (US)

(72) Inventors: Rajesh Pazhyannur, Fremont, CA (US); Vikram Chandrasekhar, Mountain View, CA (US); Raymond Yuk Chor Kwan, Swindon (GB)

(73) Assignee: Cisco Technology, Inc., San Jose, CA (US)

(*) Notice: Subject to any disclaimer, the term of this patent is extended or adjusted under 35 U.S.C. 154(b) by 200 days.

(21) Appl. No.: 15/057,733

(22) Filed: Mar. 1, 2016

(65) Prior Publication Data
US 2017/0041957 A1    Feb. 9, 2017

Related U.S. Application Data

(60) Provisional application No. 62/202,279, filed on Aug. 7, 2015.

(51) Int. Cl.
*H04W 74/08* (2009.01)

(52) U.S. Cl.
CPC ............... *H04W 74/0808* (2013.01)

(58) Field of Classification Search
None
See application file for complete search history.

(56) References Cited

U.S. PATENT DOCUMENTS

| | | | | |
|---|---|---|---|---|
| 2006/0280152 | A1* | 12/2006 | Lee | H04W 72/042 370/338 |
| 2010/0309803 | A1* | 12/2010 | Toh | H04L 1/0006 370/252 |
| 2015/0365931 | A1* | 12/2015 | Ng | H04L 1/1812 370/329 |

(Continued)

OTHER PUBLICATIONS

"LTE in Unlicensed Spectrum: Harmonious Coexistence with Wi-Fi", Qualcomm Research, 2014 Qualcomm Technologies, Inc., Jun. 2014, 19 pages.

(Continued)

*Primary Examiner* — Gregory Sefcheck
*Assistant Examiner* — Jenkey Van
(74) *Attorney, Agent, or Firm* — Edell, Shapiro & Finnan, LLC (57) ABSTRACT

A first wireless device determines the duration of a clear channel assessment interval based on feedback signals before transmitting data to a second wireless device. The first wireless device receives feedback signals, such as acknowledgement (ACK) and negative acknowledgement (NAK) signals, from one or more second wireless devices. The first wireless device determines a ratio of NAK/ACK signals in the feedback signals for a predetermined amount of time. The first wireless device determines whether the wireless medium is free by monitoring for wireless signals during a clear channel assessment interval. The duration of the clear channel assessment interval is based on the ratio of NAK/ACK signals. If the wireless medium is free for the duration of the clear channel assessment, the first wireless device wirelessly transmits data to at least one of the second wireless devices.

14 Claims, 5 Drawing Sheets

(56) References Cited

U.S. PATENT DOCUMENTS

| | | | | |
|---|---|---|---|---|
| 2016/0233989 A1* | 8/2016 | Belghoul | ............... | H04L 1/1887 |
| 2016/0242186 A1* | 8/2016 | Nissila | ................... | H04L 5/001 |
| 2016/0309511 A1* | 10/2016 | Li | ..................... | H04W 74/0808 |
| 2016/0338054 A1* | 11/2016 | Oh | ................... | H04W 74/0841 |
| 2017/0048861 A1* | 2/2017 | Choi | ..................... | H04L 5/0055 |
| 2017/0055296 A1* | 2/2017 | Cheng | ............... | H04W 74/0841 |
| 2017/0079010 A1* | 3/2017 | Zhang | ................ | H04W 72/005 |
| 2017/0079013 A1* | 3/2017 | Noh | .................... | H04W 72/042 |

OTHER PUBLICATIONS

"Detailed design of category 4 LBT mechanism", R1-154469, 3GPP TSG-RAN WG1 Meeting #82, Beijing, China, Aug. 24-28, 2015, Agenda item: 7.2.4.1, Nokia Networks, 6 pages.

\* cited by examiner

WIRELESS SHARED SPECTRUM ACCESS CONTENTION BASED ON HARQ FEEDBACK

PRIORITY CLAIM

This application claims priority to U.S. Provisional Patent Application No. 62/202,279, filed Aug. 7, 2015, the entirety of which is incorporated herein by reference.

TECHNICAL FIELD

The present disclosure relates to wireless communication networks.

BACKGROUND

The Long Term Evolution (LTE) wireless communication technology includes an advancement known as LTE-U (LTE-Unlicensed), also referred to as LTE-LAA (LTE-License Assisted Access) that utilizes unlicensed spectrum, typically in the 5 GHz band to provide additional radio spectrum.

To co-exist with other Licensed Assisted Access (LAA) devices and Wi-Fi® devices, LAA will need to deploy some form of backoff mechanism. The backoff mechanism results in a device waiting for a period of time before attempting to access the channel. Wi-Fi deploys an exponential backoff mechanism that is triggered when a Wi-Fi station does not receive an acknowledgment for its transmissions, either an acknowledgment (ACK) for a data frame or a Clear-to-Send (CTS) frame for a Request-to-Send (RTS) frame). As the name indicates, the Wi-Fi station expects an ACK for the frame shortly after the transmission. Replicating the same mechanism for LAA has two challenges. First, the LAA transmission from an Evolved Node B (eNB) may have multiple receivers. Second, the acknowledgment or negative acknowledgement from a receiver is not immediate. For example, a negative acknowledgement may not be sent until a period of time, e.g., 8 ms, has expired.

DESCRIPTION OF EXAMPLE EMBODIMENTS

Overview

Presented herein is a method for a first wireless device to determine the duration of a clear channel assessment interval based on feedback signals, before transmitting to a second wireless device. The method involves the first wireless device receiving feedback signals from one or more second wireless devices. The feedback signals may comprise acknowledgement (ACK) signals and negative acknowledgement (NAK) signals. The first wireless device determines a ratio of NAK/ACK signals in the feedback signals for a predetermined amount of time. The method further comprises determining whether a wireless medium is free by monitoring for wireless signals during a clear channel assessment interval. The duration of the clear channel assessment interval is based on the ratio of NAK/ACK signals. Responsive to a determination that the wireless medium is free for the duration of the clear channel assessment, the first wireless device wirelessly transmits data to at least one of the second wireless devices.

Detailed Description

Presented herein are techniques for a delayed Hybrid Automatic Repeat Request (HARQ) feedback to modify the defer intervals used for an initial Clear Channel Assessment (CCA) and Extended Clear Channel Assessment (ECCA). The HARQ feedback is used as input into penalty functions that determine the defer intervals. The penalty functions are provided to enable LAA transmitters to modify defer intervals based on feedback about transmission success or failure. Specifically, a penalty function for CCA and a penalty function for ECCA both capture the associated penalty for failed transmission and are based on HARQ Negative Acknowledgment (NAK) signals.

An LTE subframe structure consists of two slots each of 0.5 ms duration. Each slot comprises either 6 or 7 OFDM symbols depending on whether extended or normal cyclic prefix is used. The resources for each User Equipment (UE) on a given subframe for downlink transmissions and uplink transmissions are conveyed through a downlink scheduling grant signalled via the Physical Downlink Control Channel (PDCCH) (occupies between 1-4 symbols).

Given a grant size equalling $N_{RB,DL}$ the transmitted signal in each slot for that UE occupies $N_{SC,RB} \times N_{RB,DL}$ subcarriers in frequency domain. Assuming a sub-carrier spacing=15 KHz, then $N_{SC,RB}=12$.

LTE downlink operation is self-scheduled. That is, the downlink data is sent in the same subframe as the downlink grant. LTE uplink operation has a 4 ms latency between time of reception of uplink grant and time of transmission of the data from the UE.

The Downlink-Hybrid Automatic Repeat Request (DL-HARQ) operation has a HARQ Round Trip Time (RTT) equaling at least 8 ms, with 4 ms between time of DL (re)-transmission and reception of a HARQ-ACK signal from a UE and at least 4 ms between the HARQ-ACK and a subsequent retransmission.

For Release-13 Study Item Description (SID) on LTE in unlicensed spectrum, the assumption is that LTE transmissions in unlicensed spectrum is licensed assisted (LAA). The downlink control information (DCI) conveying scheduling information is sent via licensed spectrum. The uplink control information conveying HARQ-ACK is sent via the licensed spectrum. This involves time-synchronized reception of both carriers at the UE.

The European Telecommunications Standards Institute (ETSI) Standards for Broadband Radio Access Network (ETSUBRAN) mandates a Listen Before Talk mechanism for LAA that consists of a short interval of clear channel assessment (CCA) followed by a longer extended channel assessment (ECCA) if the channel is found to be occupied during the short interval.

Wi-Fi meets the above requirement by using a CCA for a 34 μsec interval followed by an ECCA (if required) for a random number of slots where the random number is between 1 and a value CW (Contention Window), where the slot interval is 9 μsec and the CW is set to 16.

The Wi-Fi station will wait for the channel to be unoccupied for the randomly selected number of slots and transmit after the ECCA interval expires. If the transmission is unsuccessful (e.g., based on lack of receiving a CTS frame, receiving ACK, etc.) then the Wi-Fi station may double the potential length CW of the contention window up to a predefined maximum. This doubling of CW ensures that as load (e.g., number of stations) increased, the channel continues to be used fairly.

In Wi-Fi, unsuccessful transmissions are identified shortly after transmission (typically in about 10 μsec) via the presence/absence of CTS and/or ACK signals. However, with LAA there is no CTS/ACK signal and the HARQ ACK/NAK is not received for 4 ms after the transmission.

To improve the behavior of the LAA transmitter in the shared spectrum, the LAA transmitter computes two penalty functions, one for the initial CCA and another for the ECCA. The penalty function for the initial CCA determines the duration of the CCA interval. The penalty function for the ECCA determines the duration of the ECCA interval.

There is an implicit assumption that all failed transmissions are because of potential collisions and require the eNB to defer to a greater degree. However, failed transmissions may also be due to improper link adaptation. Collision errors may be due to a hidden node transmission which causes the LAA eNB's intended receiver to experience deteriorated signal-to-noise and hence packet reception failure. Improper link adaptation errors may be caused by the LAA eNB scheduling the intended UE receiver with a coding rate that cannot be supported by the channel.

Unlike licensed spectrum transmissions, unlicensed spectrum transmissions use LBT, and consequently, LAA transmissions are discontinuous. As such, both intra-technology and inter-technology interference is dynamic, bursty, and unpredictable. Therefore, the two types of error events are, in general, difficult to distinguish.

In unlicensed shared spectrum transmission, ensuring co-existence with other technologies (e.g., neighboring LAA eNB, Wi-Fi, etc.) is equally important to protecting the individual link between the LAA eNB and each served UE. In other words, to ensure co-existence, it is better for the LAA eNB to access the medium more conservatively since its transmissions may be creating interference to devices belonging to both intra-technology and inter-technology Radio Access Technologies (RATs). The conservative medium access is ensured by increasing the contention window size at the LAA eNB as a function of the number of NAKs received from its UEs.

For example, if an LAA eNB receives a high fraction of NAKs in its transmission opportunity (TxOP), that may indicate the presence of a hidden WiFi node, i.e., the wireless link between the WiFi Access Point and a WiFi receiver station is below the Energy Detection threshold at the LAA eNB. By increasing the contention window size at the LAA eNB, the LAA eNB reduces its frequency of transmissions and increases the probability of successful reception at devices belonging to the hidden Wi-Fi Basic Service Set. If, upon receipt of NAKs, the LAA eNB were to simply reduce its Modulation and Coding Scheme (MCS) without increasing its contention window, the LAA eNB would generate greater levels of interference to hidden Wi-Fi nodes as a result of occupying the medium longer with a lower code rate.

Figure 1:
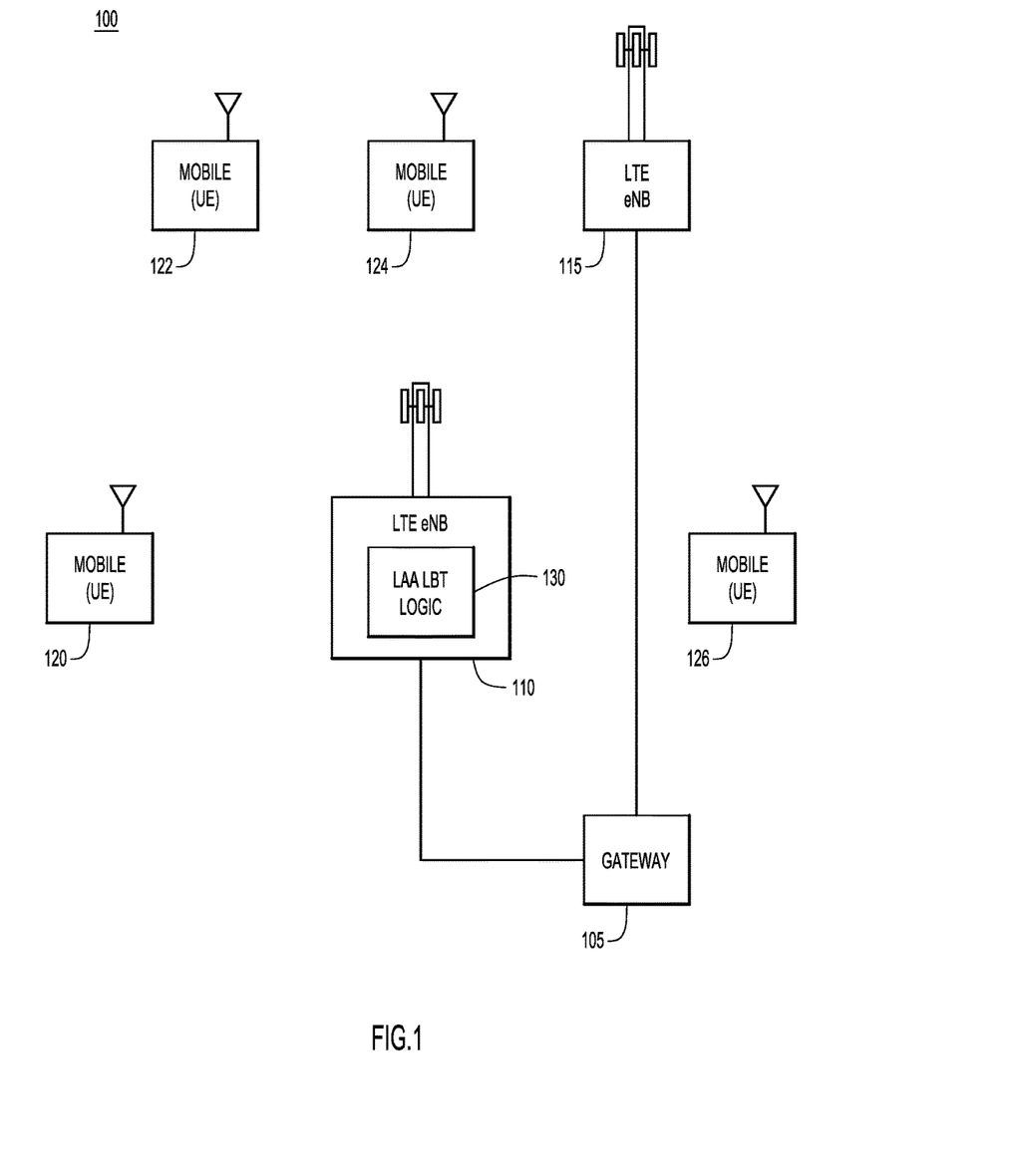
FIG. 1 is a simplified block diagram illustrating a cellular networking system employing a Listen Before Transmit (LBT) backoff algorithm according to an example embodiment.

Referring now to FIG. 1, a simplified block diagram illustrates an LAA system 100 that implements an LBT backoff mechanism according to one example embodiment. A gateway 105, such as a serving gateway provides data to LTE evolved node B (eNB) 110 and LTE eNB 115. The LTE eNBs 110 and 115 communicate with mobile devices (e.g., user equipment) 120, 122, 124, and 126. Each of the mobile devices 120, 122, 124, and 126 associate with a particular eNB 110 or 115 to send and receive data through the gateway 105. The LTE eNB 110 includes LAA LBT logic 130 to allow the LTE eNB 110 to fairly share the unlicensed spectrum with other transmitters, such as other LAA transmitters and/or Wi-Fi transmitters (not shown).

In one example, the mobile device 120 is associated with the eNB 110 and the two devices communicate data over a shared spectrum in the LAA system 100. The communication link from the eNB 110 to the mobile device 120 is also referred to as the downlink (DL), and the communication link from the mobile device 120 to the eNB 110 is referred to as the uplink (UL). Both the downlink and uplink communications provide HARQ feedback to the respective transmitter. As such, the LBT mechanism that relies on the HARQ feedback to determine the CCA and ECCA intervals may be implemented on the uplink and/or the downlink.

While only two LTE eNB devices and four mobile devices are shown in LAA system 100, any number of LAA transmitters (i.e., eNB or UE devices) may use the techniques presented herein to fairly share an unlicensed spectrum with each other and with other transmitters (e.g., Wi-Fi transmitters) that use the shared spectrum. Hereinafter, the techniques will generally be described with the eNB 110 acting as a transmitter 110 to describe the LBT techniques, but the same techniques may apply to a mobile device acting as the transmitter.

Before the transmitter 110 transmits data into the shared spectrum, it will listen for other signals in the shared spectrum that would interfere with a transmission from the transmitter 110. Initially, the transmitter 110 listens for a CCA interval duration that is dependent on the percentage of NAK/ACK HARQ feedback signals received in previous transmission opportunities (TxOPs), as described hereinafter. If the transmitter 110 does not detect any transmissions during the CCA interval, then the transmitter 110 transmits the data at the next TxOP. If the transmitter 110 detects a potentially interfering transmission during the CCA interval, it performs an ECCA process to fairly contend with any other transmitters in the area.

In the ECCA process, also referred to as a backoff mechanism, the transmitter 110 selects an interval of time between zero and a contention window value that is dependent on the percentage of NAK/ACK HARQ feedback signals received in previous TxOPs, as described hereinafter. The transmitter 110 waits for the shared spectrum to be free for the selected interval of time and then transmits the data. In some examples, the transmitter 110 may double the contention window, i.e., the maximum amount of time that the transmitter 110 backs off, if the transmission is unsuccessful after backing off for the previous contention window.

In one example, it is assumed that the transmitter 110 will transmit in bursts. Once the transmitter 110 gets access to the shared spectrum, it will transmit a burst of subframes. The transmitter 110 will receive a set of ACK/NAK signals for the various protocol data units (PDUs) from various receivers, e.g., mobile devices 120, 122, 124, and/or 126. Let a($t_1$, $t_2$) refer to the percentage of NAKs received via HARQ-ACK feedback during the TxOP beginning at $t_1$ and ending at $t_2$. This may also be referred to as the Block Error Rate (BLER). The duration of the transmission opportunity (e.g., $t_1-t_2$) may be a function of region-specific regulations on the maximum transmission burst duration and the transmitter queue size.

Each HARQ-ACK feedback signal is communicated by the receiver, e.g., mobile device 120, via control channel feedback following decoding of downlink transmissions from the transmitter 110. While the penalty function described hereinafter assumes downlink transmissions, the same ideas may be applied for the uplink direction as well. In that case, the BLER at the mobile device 120 is computed as a function of the NAKs received via the HARQ-ACK feedback signals from the transmitter 110. Since the penalty function is typically a function of the BLER computed during the TxOP occurring between $t_1$ and $t_2$, the epoch index T (defined as $T=t_1-t_2$) is used in the examples of penalty functions. For example, a(T) is referred to as the BLER in the most recent epoch T, a(T–1) is referred to as the BLER during the preceding TxOP (T–1), and so on.

In one example, the epoch T may be modified based on the length of the TxOP and the start time of the TxOP. In other words, while a typical LAA TxOP is 10 ms in length, the transmitter 110 may shorten or lengthen the epoch T from 10 ms to capture more or less feedback. Additionally, a transmitter 110 in a typical LAA system would set the start time 4 ms to ensure that all of the HARQ feedback was received from the previous TxOP. That is, for a transmission starting at time t in a typical LAA system the transmitter 110 would typically set the epoch T from t−14 ms to t−4 ms to capture all of the HARQ feedback from the previous TxOP. However, the transmitter 110 may adjust either or both of the start time (e.g., t−8 ms) and the total interval time (e.g., 15 ms).

Prior to transmitting a burst at time t, the transmitter 110 may compute the following:
- a(T), the BLER function for last TxOP interval at T, as described above;
- P_CCA(T)=f1 (a(T)), where f1 is a function of BLER starting at 0, i.e., f1 (0)=0; and
- P_ECCA(T)=f2 (a(T)), where f2 is a function of BLER starting at 0, i.e., f2 (0)=0.

In one example, the initial CCA interval duration for a transmission at time t, CCA(t), may be computed as:

$$CCA(t)=20 \ \mu s*(1+P\_CCA(T))$$

The ECCA interval duration, ECCA(t), i.e., the contention window, for a transmission at time t, may computed as:
ECCA(t)=min(ECCAmin*(1+P_ECCA(T),ECCAmax), where ECCAmin and ECCAmax are nominal values that impose a lower limit (e.g., 34 µs) and an upper limit (e.g., 500 µs), respectively, on the ECCA duration.

In another example, the penalty functions may be memory-less functions that are static and based only on the most recent epoch T. Alternatively, the penalty functions may include information from at least one previous epoch T−1. For example, a memory-less penalty function P_CCA (T) for calculating the CCA interval, CCA(t), may be:

$$P\_CCA(a(T)) = 0, \ a(T) = 0$$
$$= 0.5, \ 0 < a(T) \le .25$$
$$= 1.0, \ .25 < a(T) \le .75$$
$$= 2.0, \ .75 < a(T) \le 1.00$$

Similarly, a memory-less function P_ECCA(T) for calculating the contention window ECCA(t) may be:

$$P\_ECCA(a(T)) = 0, \ a(T) = 0$$
$$= 0.25, \ 0 < a(T) \le .50$$
$$= 0.5, \ .50 < a(T) \le .75$$
$$= 1.0, \ .75 < a(T) \le 1.00$$

An example of penalty function P_ECCA(a(T)) that adapts to the BLER in previous epochs may be:
P_ECCA(a(T))=rand(0, Q(a(T))
Where rand(arg1, arg2) picks a uniformly random value within the interval (arg1, arg2).
$Q(a(T))=r^{y(a(T))}$, where
r is a positive scalar (e.g., 2), and
y(a(T)) is recursively defined as:
y(a(T))=M+y(a(T−1)) if alpha(T−1)>0,
y(a(T))=N otherwise, where
M and N are positive scalars (e.g., 1).

The penalty functions described above modify the CCA interval duration and the contention window in the ECCA interval based on feedback (e.g., HARQ-ACK/NAK feedback) about whether previous transmissions were successful. This behavior ensures that the transmitter 110 shares the unlicensed spectrum fairly among any other transmitters that also require access to the unlicensed spectrum.

Figure 2:
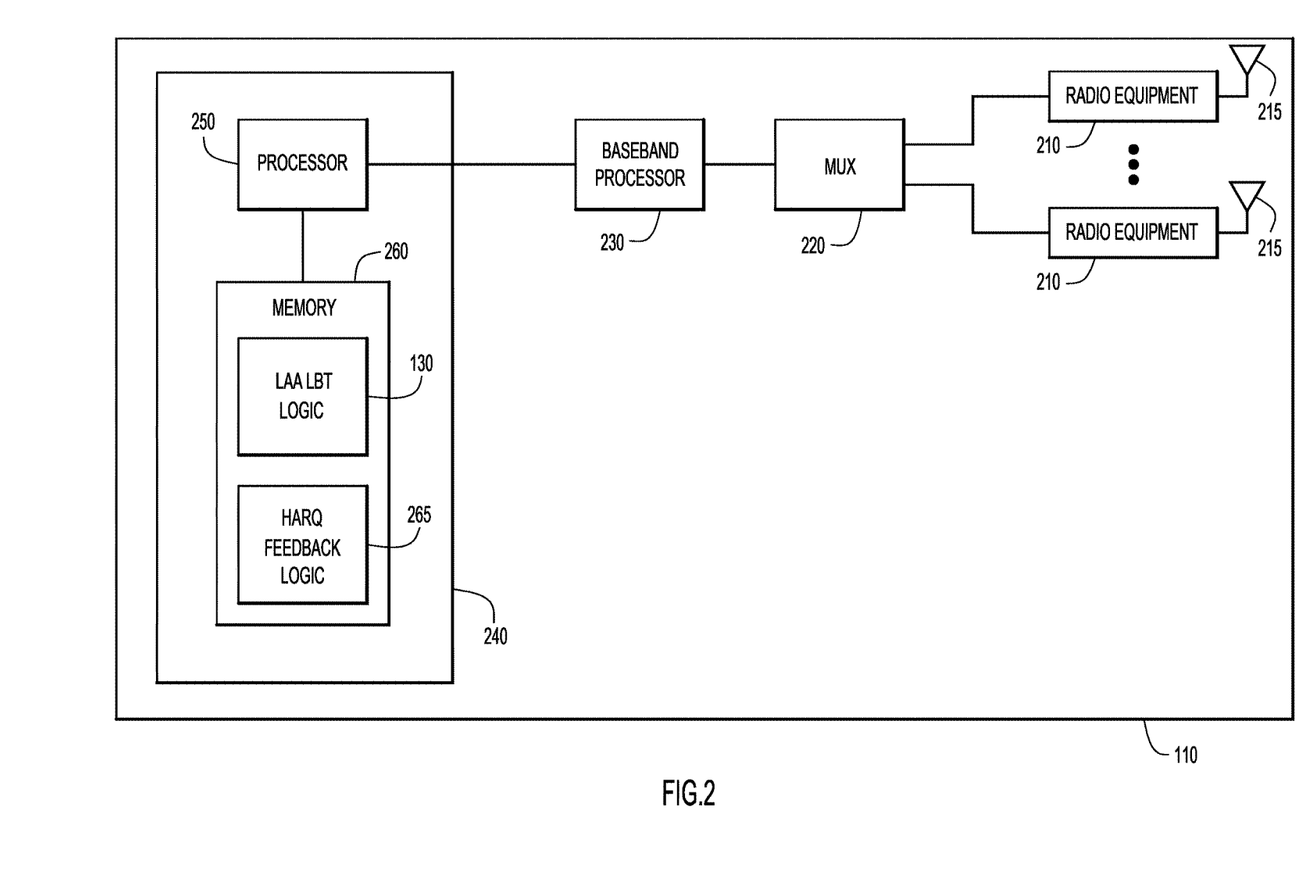
FIG. 2 is a block diagram illustrating a wireless transceiver apparatus configured to perform the backoff algorithm, according to an example embodiment.

Referring now to FIG. 2, a simplified block diagram is shown of the transmitter 110 configured to perform the backoff techniques modified by HARQ feedback. In one example, the transmitter 110 may be a small cell eNB (e.g., a Femtocell Access Point, Picocell Access Point, Home eNB, etc.). The transmitter 110 includes radio equipment 210 connected to respective antennas 215, a multiplexer (MUX) 220, a baseband processor block 230, and a controller 240. The controller 240 may include one or more microprocessors or microcontrollers (e.g., processor 250) and memory 260. The memory 260 includes instructions (e.g., instructions for LAA LBT logic 130) and data (e.g., from HARQ feedback logic 265) that, when executed by the one or more processors 250 cause the controller 240 to perform the operations described herein.

The memory 260 may include read only memory (ROM), random access memory (RAM), magnetic disk storage media devices, optical storage media devices, flash memory devices, electrical, optical, or other physical/tangible memory storage devices. Thus, in general, the memory 260 may comprise one or more tangible (non-transitory) computer readable storage media (e.g., a memory device) encoded with software comprising computer executable instructions and when the software is executed it is operable to perform the operations described herein. It should be understood that the functions LAA LBT logic 130 and HARQ feedback logic 265 may be part of the functions performed by the baseband processor 230, implemented in digital logic gates, e.g., in one or more application specific integrated circuits (ASICs).

Figure 3:
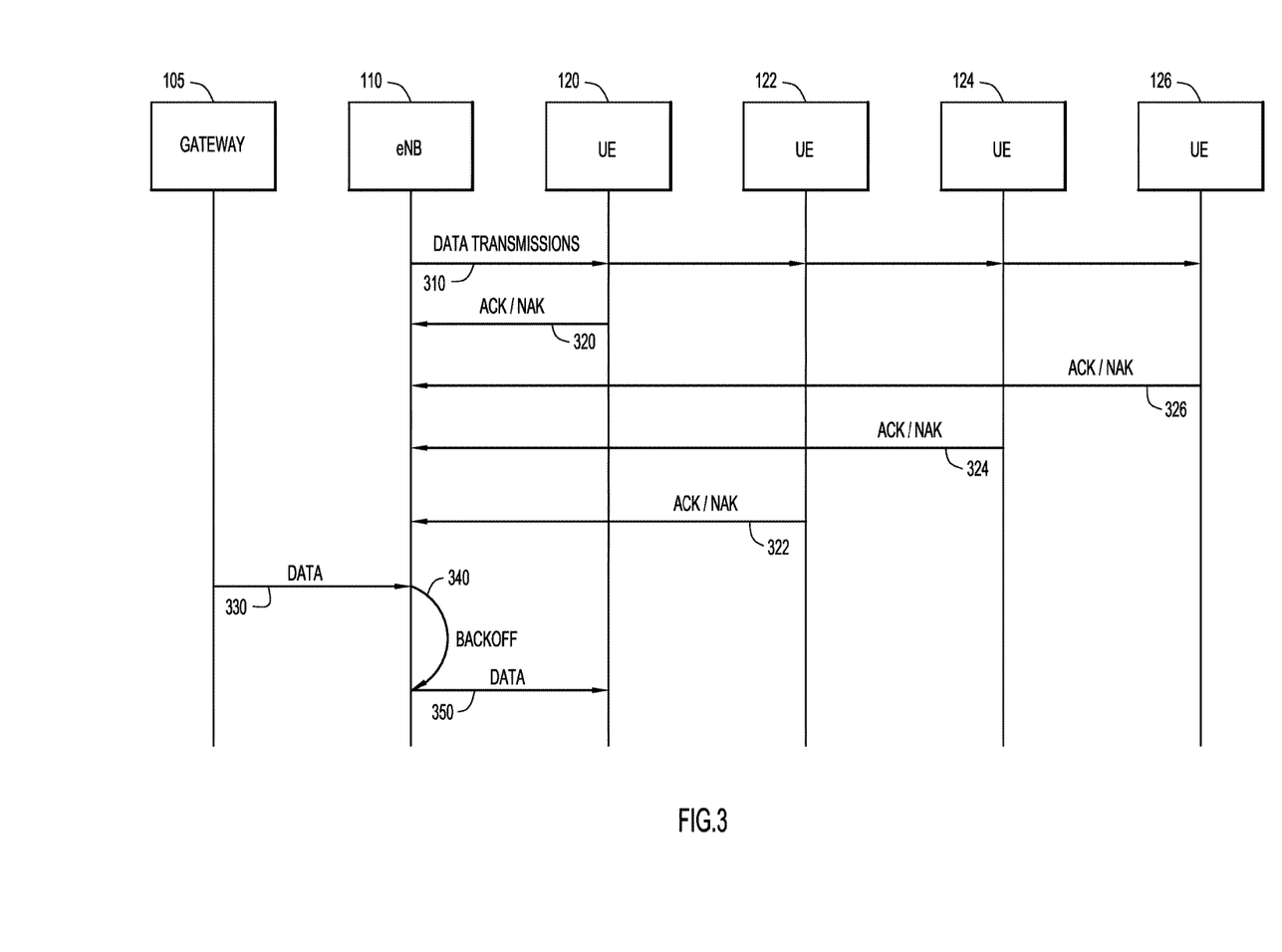
FIG. 3 is a sequence diagram showing messages passed in performing the backoff algorithm according to an example embodiment.

Referring now to FIG. 3, a sequence diagram illustrates the messages between LAA transceivers in the eNB 110 implementing the backoff mechanism based on HARQ feedback from UE mobile devices 120, 122, 124, and 126. Initially, eNB 110 sends one or more data transmissions 310 to each of the mobile devices 120, 122, 124, and 126. The data transmissions 310 may be made across multiple TxOPs or in a single TxOP. In response to the data transmissions 310, the mobile devices 120, 122, 124, and 126 send HARQ feedback signals 320, 322, 324, and 326, respectively. The HARQ feedback signals include an ACK or NAK signal depending on whether the respective mobile device received the data transmission 310.

The gateway 105 sends data 330 to the eNB 110 so that the eNB 110 can transmit the data to mobile device 120. In response to receiving the data 330, the eNB 110 performs the backoff process 340, as described herein. In one example, the eNB 110 calculates the penalty functions for the CCA interval and for the ECCA contention window based on only the HARQ feedback 320 from the mobile device 120. Alternatively, the penalty functions may be based on some or all of the HARQ feedback 320, 322, 324, and/or 326 from any associated mobile device. After performing the backoff process 340 and determining that the shared spectrum is available, the eNB 110 transmits data 350 to the mobile device 120.

In one example, the mobile device 120 may perform the same backoff process as the eNB 110 in accessing the shared spectrum. However, since the mobile device 120 only receives HARQ feedback from its associated eNB 110, the mobile device 120 may sample the feedback signals from a larger time frame to determine the appropriate penalty functions. That is, since the transmitter in the eNB 110 receives HARQ feedback from multiple receiving mobile devices 120 associated with the eNB 110, it can form a statistically accurate picture in a shorter time frame than the transmitter in a mobile device 120, which only receives HARQ feedback from a single eNB.

Figure 4:
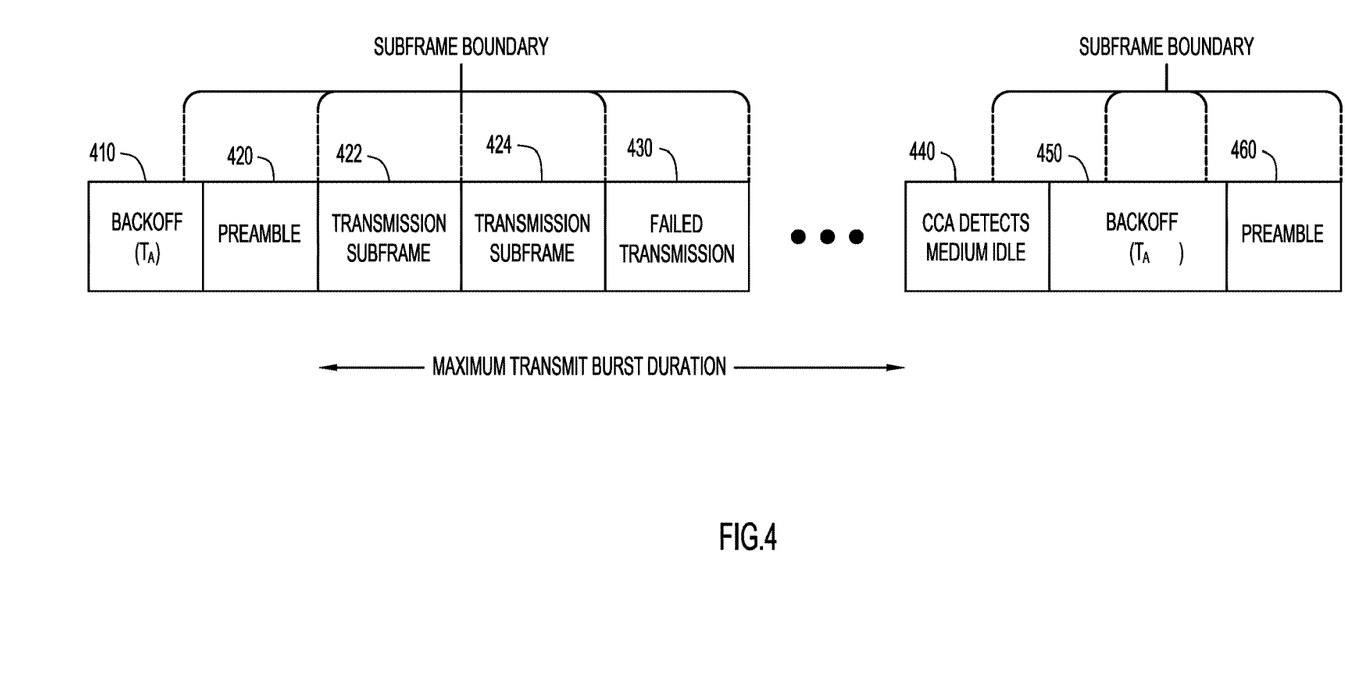
FIG. 4 is diagram depicting timing associated with the backoff algorithm according to an example embodiment.

Referring now to FIG. 4, a timing diagram is shown for a transmitter performing a backoff process according to the techniques described herein. After an initial backoff period 410 with a duration of $T_A$, the transmitter sends out a preamble 420. In one example, the preamble may include information regarding the upcoming transmission burst. At the subframe boundary following the expiration of the backoff period 410, the transmitter starts a transmission burst with subframe 422. After a second successfully transmitted subframe 424, a subframe 430 fails to be received at the receiving device.

After the maximum transmission burst duration, if the transmitter detects that the shared spectrum is idle for a CCA period 440, then the transmitter begins a second backoff period 450. The second backoff period 450 has a duration $T_B$ that is calculated from the feedback received from receivers of prior transmissions (e.g., subframes 422, 424, 430, etc.). Based on the percentage of NAK feedback signals to ACK feedback signals, the transmitter calculates a penalty function as described herein, and lengthens the backoff time $T_B$ due to the failed transmission 430. After the second backoff period 450 expires, the transmitter beings the next TxOP with a preamble 460, followed by further transmission subframes.

Figure 5:
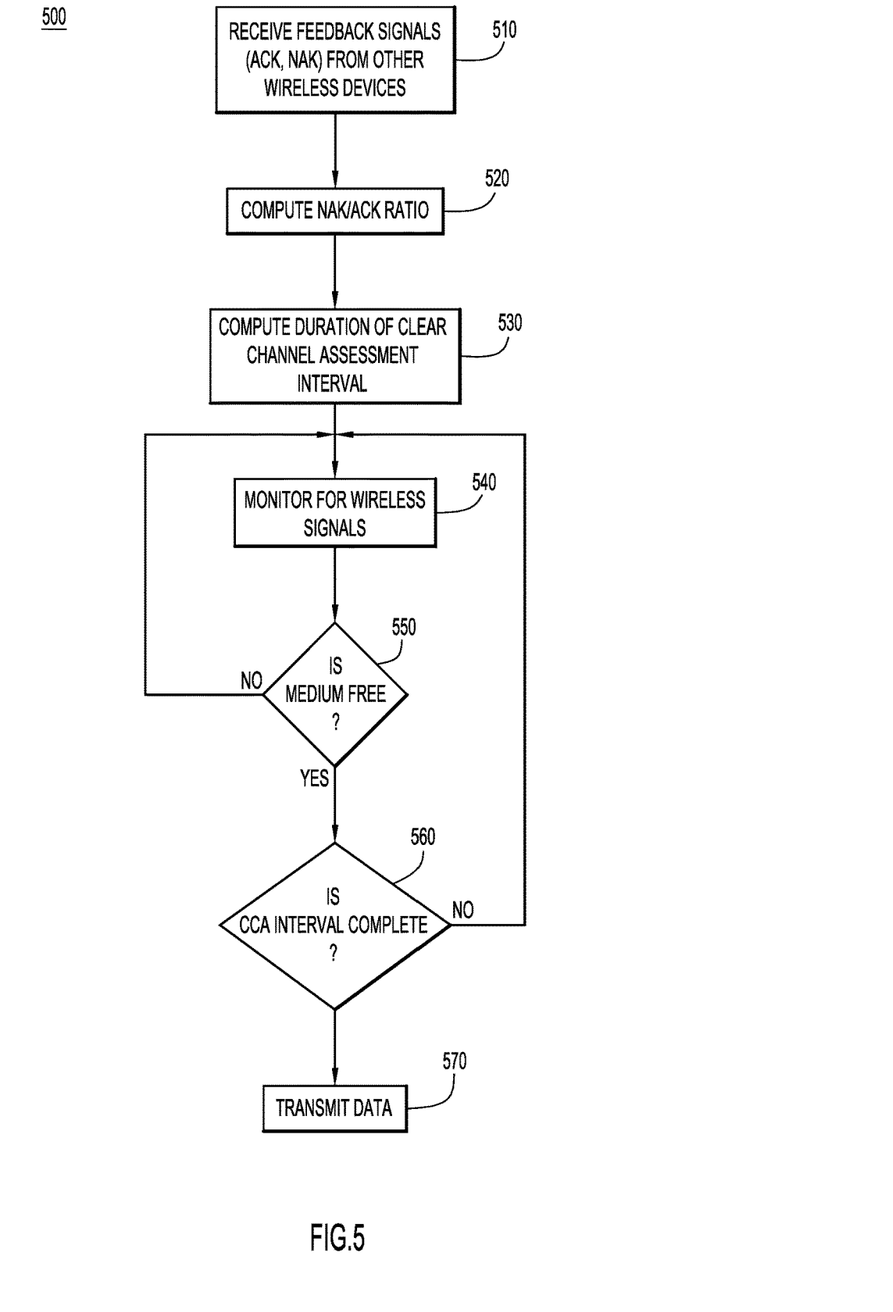
FIG. 5 is a flowchart illustrating methods for performing the backoff algorithm according to an example embodiment.

Referring now to FIG. 5, a flowchart shows the operations performed by a transmitter in implementing the backoff mechanism based on feedback from prior transmissions. In step 510, the transmitter receives feedback, such ACK/NAK signals, from one or more receivers of prior transmissions. The transmitter determines the ratio of received NAK feedback signals to ACK feedback signals in step 520. The transmitter may determine the ratio for all feedback signals received in a predetermined amount of time, such as over the previous one or more TxOPs.

In step 530, the transmitter computes a duration for a CCA interval based on the ratio of NAK/ACK signals. In one example, the duration may be based on a monotonic penalty function starting at zero, i.e., there is no penalty for a ratio of zero NAK/ACK. During the CCA interval, the transmitter monitors for wireless signals on the shared spectrum in step 540. If the transmitter detects a wireless signal that could interfere with its transmission, then the transmitters determines that the medium is not free at step 550 and returns to monitoring for wireless signals. After the entire duration of the CCA interval is complete, as determined in step 560, then the transmitter transmits the data in step 570.

In summary, the defer intervals for initial clear channel assessment (CCA) intervals and extended clear channel assessment (ECCA) contention windows are made a function of HARQ feedback associated with transmissions during one or more transmission burst opportunities (TxOPs). The HARQ feedback, specifically the proportion of negative ACKs, is used as an input into penalty functions that determine the duration of the defer intervals. The two penalty functions are provided to enable LAA eNBs to modify defer intervals based on the proportion of negative ACKs communicated via HARQ-ACK feedback from the uplink control information communicated by the UE to its serving eNB. Specifically, the penalty functions for CCA, and ECCA, respectively, capture the associated penalty for failed transmissions. Like Wi-Fi there is an implicit assumption that all failed transmissions are because of potential collisions and require the eNB to defer to a greater degree.

In one form, a method is provided for a first wireless device to determine the duration of a clear channel assessment interval based on feedback signals before transmitting to a second wireless device. The method comprises the first wireless device receiving feedback signals from one or more second wireless devices. The feedback signals comprise acknowledgement (ACK) signals and negative acknowledgement (NAK) signals. The first wireless device determines a ratio of NAK/ACK signals in the feedback signals for a predetermined amount of time. The method further comprises determining whether a wireless medium is free by monitoring for wireless signals during a clear channel assessment interval. The duration of the clear channel assessment interval is based on the ratio of NAK/ACK signals. Responsive to a determination that the wireless medium is free for the duration of the clear channel assessment, the first wireless device wirelessly transmits data to at least one of the second wireless devices.

In another form, an apparatus is provided to determine the duration of a clear channel assessment interval based on feedback signals before transmitting to a wireless device. The apparatus comprises a transmitter, a receiver and a processor. The transmitter is configured to wirelessly transmit data to at least one wireless device. The receiver is configured to receive wireless signals on a wireless medium. The processor is configured to receive feedback signals from the at least one wireless device via the receiver. The feedback signals comprise acknowledgement (ACK) signals and negative acknowledgement (NAK) signals. The processor is also configured to determine a ratio of NAK/ACK signals in the feedback signals for a predetermined period of time. The processor determines whether the wireless medium is free by monitoring fro wireless signals during a clear channel assessment interval. The processor is further configured to compute a duration of the clear channel assessment interval based on the ratio of NAK/ACK signals. Responsive to a determination that the wireless medium is free for the duration of the clear channel assessment interval, the processor is configured to cause the transmitter to wirelessly transmit data to the at least one wireless device.

In yet another form, a system is provided for a transmitter to determine a duration of a clear channel assessment interval before transmitting in a shared wireless medium. The system comprises one or more first wireless devices and a second wireless device. The first wireless device(s) are configured to provide feedback signals. The feedback signals comprise acknowledgement (ACK) signals and negative acknowledgement (NAK) signals. The second wireless device is configured to receive the feedback signals from the one or more first wireless devices, and determine a ratio of NAK/ACK signals in the feedback signals for a predetermined period of time. The second wireless device is also configured to determine whether the wireless medium is free by monitoring for wireless signals during a clear channel assessment interval. The second wireless device computes the duration of the clear channel assessment interval based on the ratio of NAK/ACK signals. Responsive to a determination that the wireless medium is free for the duration of the clear channel assessment interval, the second wireless device in configured to wirelessly transmit data to at least one of the first wireless devices.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a first wireless device, receiving feedback signals from one or more second wireless devices, the feedback signals comprising acknowledgement (ACK) signals and negative acknowledgement (NAK) signals;
computing a ratio of NAK/ACK signals in the feedback signals for a predetermined period of time;
computing a duration of a clear channel assessment interval based on a first penalty function of the ratio of NAK/ACK signals;
determining whether a wireless medium is free for the duration of the clear channel assessment interval by monitoring for wireless signals during the clear channel assessment interval before an extended clear channel assessment interval;
if the wireless medium is determined to be free for the duration of the clear channel assessment, omitting the extended clear channel assessment interval and wirelessly transmitting data to at least one of the second wireless devices; and
if the wireless medium is determined not to be free during the clear channel assessment interval, monitoring for wireless signals for a duration of the extended clear channel assessment interval that is uniformly randomly selected up to a maximum contention window and wirelessly transmitting the data to the at least one of the second wireless devices after determining that the wireless medium is free for the duration of the extended clear channel assessment interval, wherein the maximum contention window is computed as a second penalty function of the ratio of NAK/ACK signals.

2. The method of claim 1, wherein computing the duration of the clear channel assessment interval comprises calculating a penalty function based on a monotonic function of the ratio of NAK/ACK signals.

3. The method of claim 1, further comprising doubling the maximum contention window responsive to a detection of a wireless signal during the extended clear channel assessment interval.

4. The method of claim 1, wherein the feedback signals are Hybrid Automatic Repeat request (HARQ) signals in a Long Term Evolution (LTE) system.

5. The method of claim 4, wherein the first wireless device comprises an LTE evolved node B (eNB), and the HARQ signals are received from a plurality of user equipment (UE) devices associated with the LTE eNB.

6. The method of claim 4, wherein the first wireless device comprises an LTE user equipment (UE) device, and the HARQ signals are received from an associated LTE evolved node B (eNB).

7. An apparatus comprising:
a transmitter configured to wirelessly transmit data to at least one wireless device;
a receiver configured to receive wireless signals on a wireless medium; and
a processor configured to:
receive feedback signals from the at least one wireless device via the receiver, the feedback signals comprising acknowledgement (ACK) signals and negative acknowledgement (NAK) signals;
compute a ratio of NAK/ACK signals in the feedback signals for a predetermined period of time;
compute a duration of a clear channel assessment interval based on a first penalty function of the ratio of NAK/ACK signals;
determine whether the wireless medium is free for the duration of the clear channel assessment interval by monitoring for wireless signals during the clear channel assessment interval before an extended clear channel assessment interval;
if the wireless medium is determined to be free for the duration of the clear channel assessment interval, omit the extended clear channel assessment interval and cause the transmitter to wirelessly transmitting data to the at least one wireless device; and
if the wireless medium is determined not to be free during the clear channel assessment interval, monitor with the receiver for wireless signals for a duration of the extended clear channel assessment interval that is uniformly randomly selected up to a maximum contention window and cause the transmitter to wirelessly transmit the data to the at least one wireless device after determining that the wireless medium is free for the duration of the extended clear channel assessment interval, wherein the maximum contention window is computed as a second penalty function of the ratio of NAK/ACK signals.

8. The apparatus of claim 7, wherein the processor is configured to compute the duration of the clear channel assessment interval by calculating a penalty function based on a monotonic function of the ratio of NAK/ACK signals.

9. The apparatus of claim 7, wherein the processor is further configured to double the maximum contention window responsive to a detection of a wireless signal during the extended clear channel assessment interval.

10. The apparatus of claim 7, wherein the feedback signals are Hybrid Automatic Repeat request (HARQ) signals in a Long Term Evolution (LTE) system, and the receiver is configured to receive the HARQ signals from a plurality of user equipment (UE) devices associated with the apparatus.

11. The apparatus of claim 7, wherein the feedback signals are Hybrid Automatic Repeat request (HARQ) signals in a Long Term Evolution (LTE) system, and the receiver is configured to receive the HARQ signals from an LTE evolved node B (eNB) associated with the apparatus.

12. A system comprising:
one or more first wireless devices configured to provide feedback signals, the feedback signals comprising acknowledgement (ACK) signals and negative acknowledgement (NAK) signals; and
a second wireless device configured to:
receive the feedback signals from the one or more first wireless devices;
compute a ratio of NAK/ACK signals in the feedback signals for a predetermined period of time;
compute a duration of a clear channel assessment interval based on a first penalty function of the ratio of NAK/ACK signals;
determine whether a wireless medium is free for the duration of the clear channel assessment interval by monitoring for wireless signals during the clear channel assessment interval before an extended clear channel assessment interval;
if the wireless medium is determined to be free for the duration of the clear channel assessment interval, omit the extended clear channel assessment interval and wirelessly transmit data to at least one of the first wireless devices; and
if the wireless medium is determined not to be free during the clear channel assessment interval, monitor with the receiver for wireless signals for a duration of the extended clear channel assessment interval that is uniformly randomly selected up to a maximum contention window and cause the transmitter to wirelessly transmit the data to the at least one wireless device after determining that the wireless medium is free for the duration of the extended clear channel assessment interval, wherein the maximum contention window is computed as a second penalty function of the ratio of NAK/ACK signals.

13. The system of claim 12, wherein the one or more first wireless devices comprise a plurality of Long Term Evolution (LTE) user equipment (UE) devices configured to provide the feedback signals as Hybrid Automatic Repeat request (HARQ) signals, and wherein the second wireless device comprises an LTE evolved node B (eNB) associated with the plurality of LTE UE devices.

14. The system of claim 12, wherein the one or more first wireless devices comprise a Long Term Evolution (LTE) evolved node B (eNB) configured to provide the feedback signals as Hybrid Automatic Repeat request (HARQ) signals, and wherein the second wireless device comprises an LTE user equipment (UE) device associated with the LTE eNB device.

* * * * *